United States Patent [19]

Uhlig

[11] 4,206,171

[45] Jun. 3, 1980

[54] METHOD FOR THERMAL CONDITIONING A THERMOPLASTIC PARISON

[75] Inventor: Albert R. Uhlig, Toledo, Ohio

[73] Assignee: Owens-Illinois, Inc., Toledo, Ohio

[21] Appl. No.: 868,232

[22] Filed: Jan. 9, 1978

Related U.S. Application Data

[62] Division of Ser. No. 748,002, Dec. 6, 1976, Pat. No. 4,087,227.

[51] Int. Cl.² .............................................. B29C 17/07
[52] U.S. Cl. ..................................................... 264/520
[58] Field of Search ...................... 264/89, 94, 96–99, 264/327, 520, 521; 425/526

[56] References Cited

U.S. PATENT DOCUMENTS

| 2,046,372 | 7/1936 | Engstrom | 264/327 X |
| 3,294,883 | 12/1966 | Polka | 264/97 OR |
| 3,470,282 | 9/1969 | Scalora | 264/97 |
| 3,768,948 | 10/1973 | Horberg, Jr. et al. | 425/526 OR |
| 3,769,379 | 10/1973 | Hinrichs | 264/327 X |
| 3,776,991 | 12/1973 | Marcus | 264/97 X |
| 3,930,779 | 1/1976 | Farrell | 425/526 OR |
| 3,940,231 | 2/1976 | Uhlig | 425/526 X |

FOREIGN PATENT DOCUMENTS 507802 7/1971 Switzerland.

*Primary Examiner*—Jan H. Silbaugh
*Attorney, Agent, or Firm*—Charles S. Lynch; M. E. Click; D. H. Wilson

[57] ABSTRACT

An improved shell mold and method are provided for thermal conditioning a thermoplastic parison prior to blow molding the parison into a hollow container and especially a biaxially oriented container. The mold has an inner shell and an outer shell defining a passageway therebetween for a circulated heat transfer fluid. Heat transfer between the fluid and the parison is controlled to adjust the thermal history at different locations of the parison as it will be required by the mode of stretching and the blow out ratio at the different locations.

2 Claims, 19 Drawing Figures

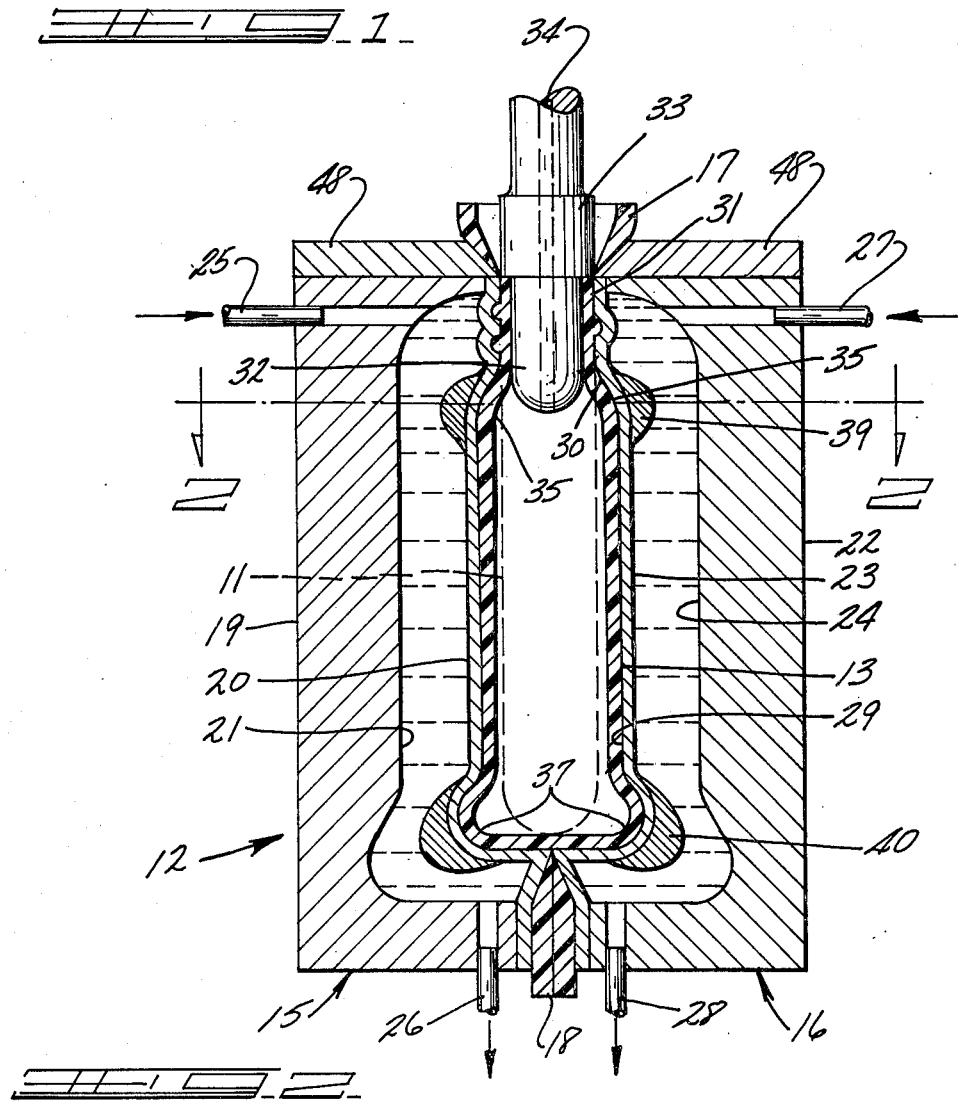
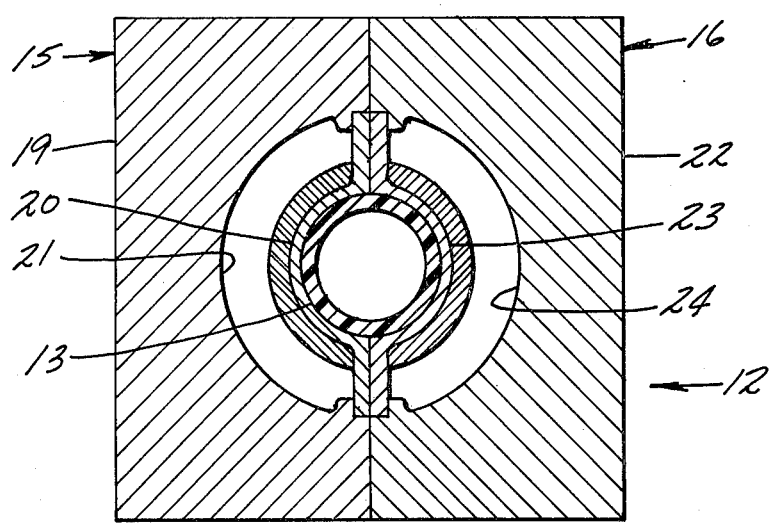

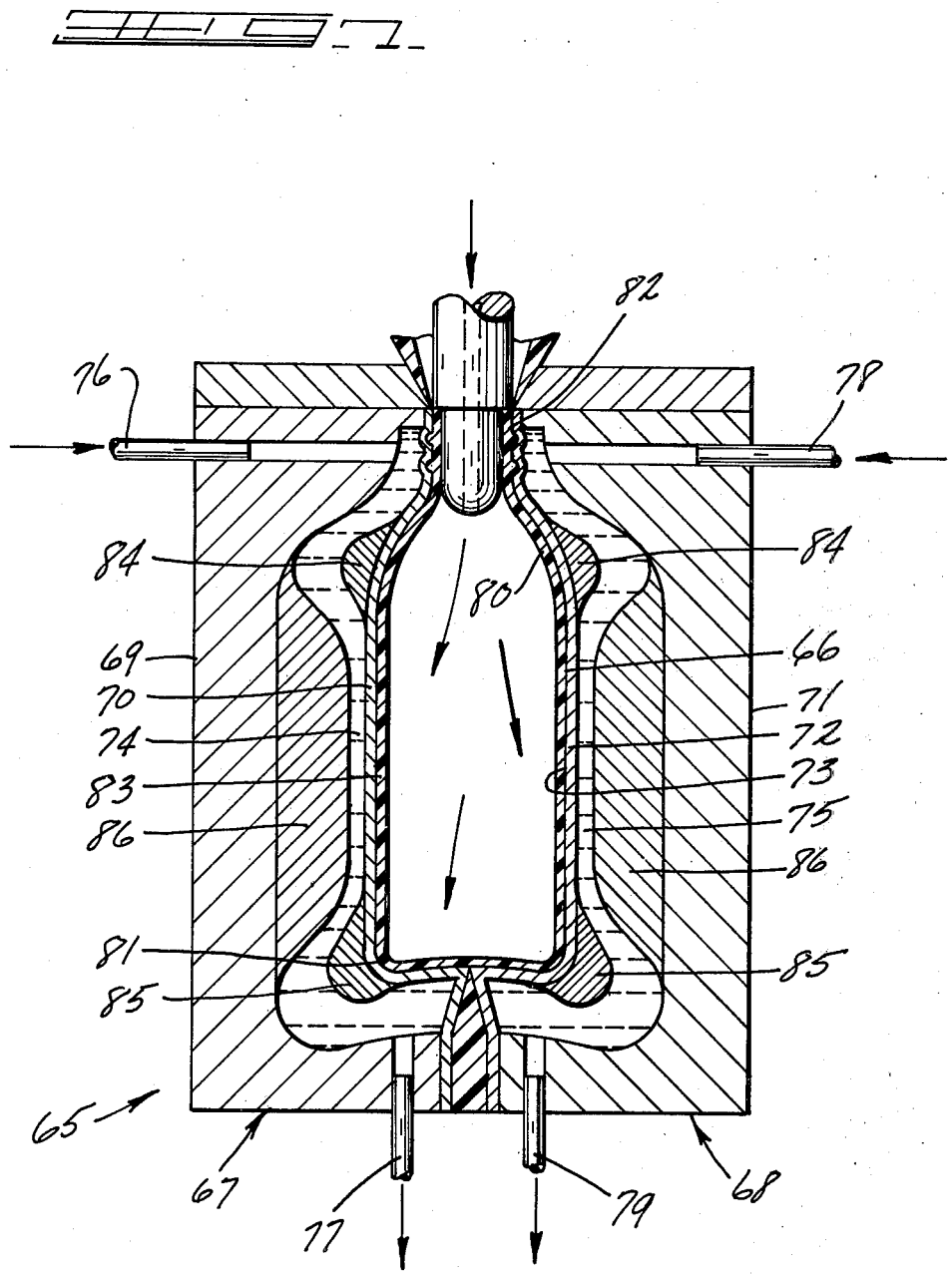

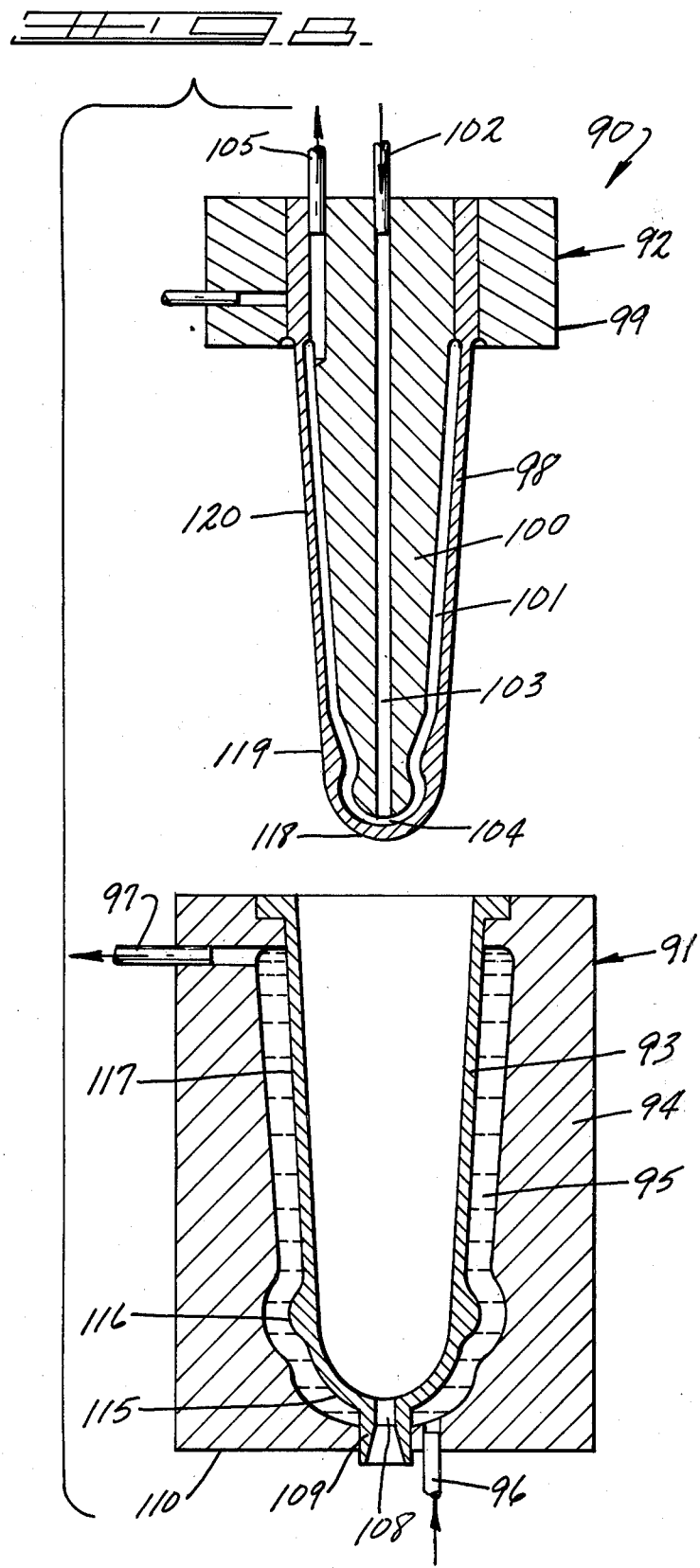

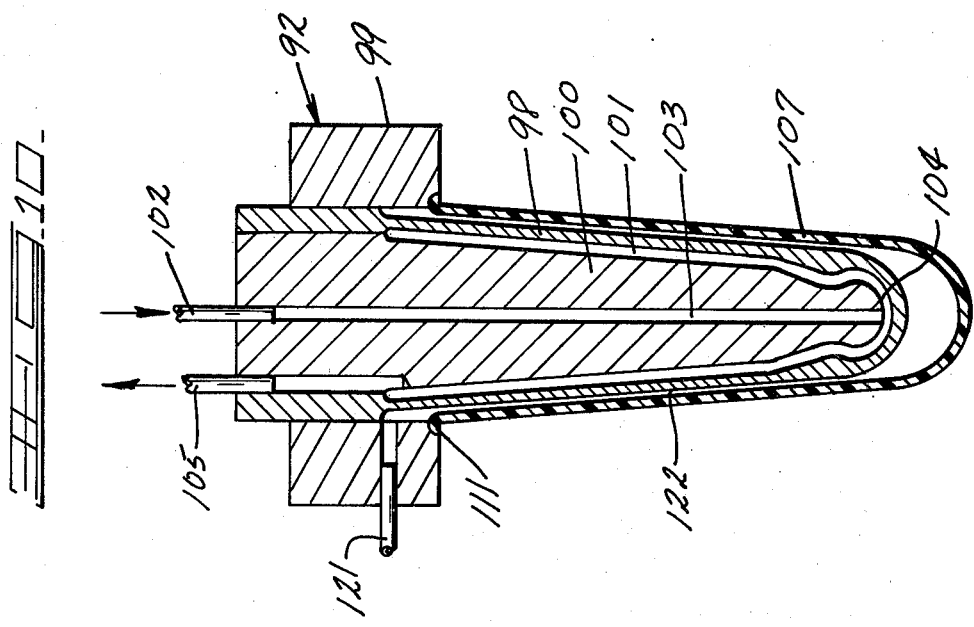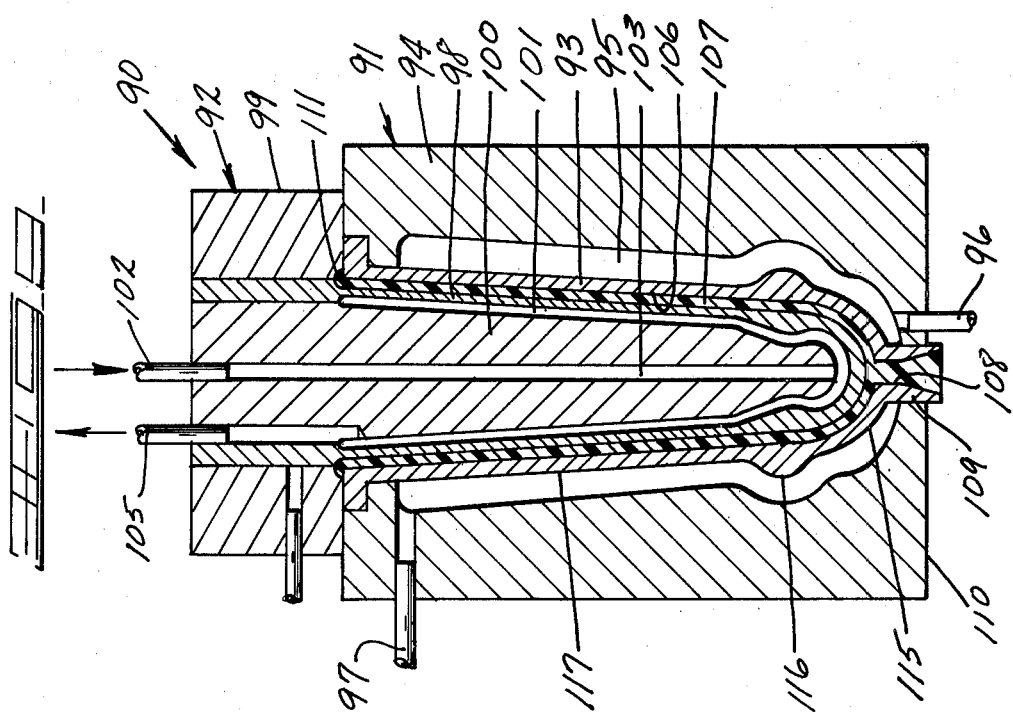

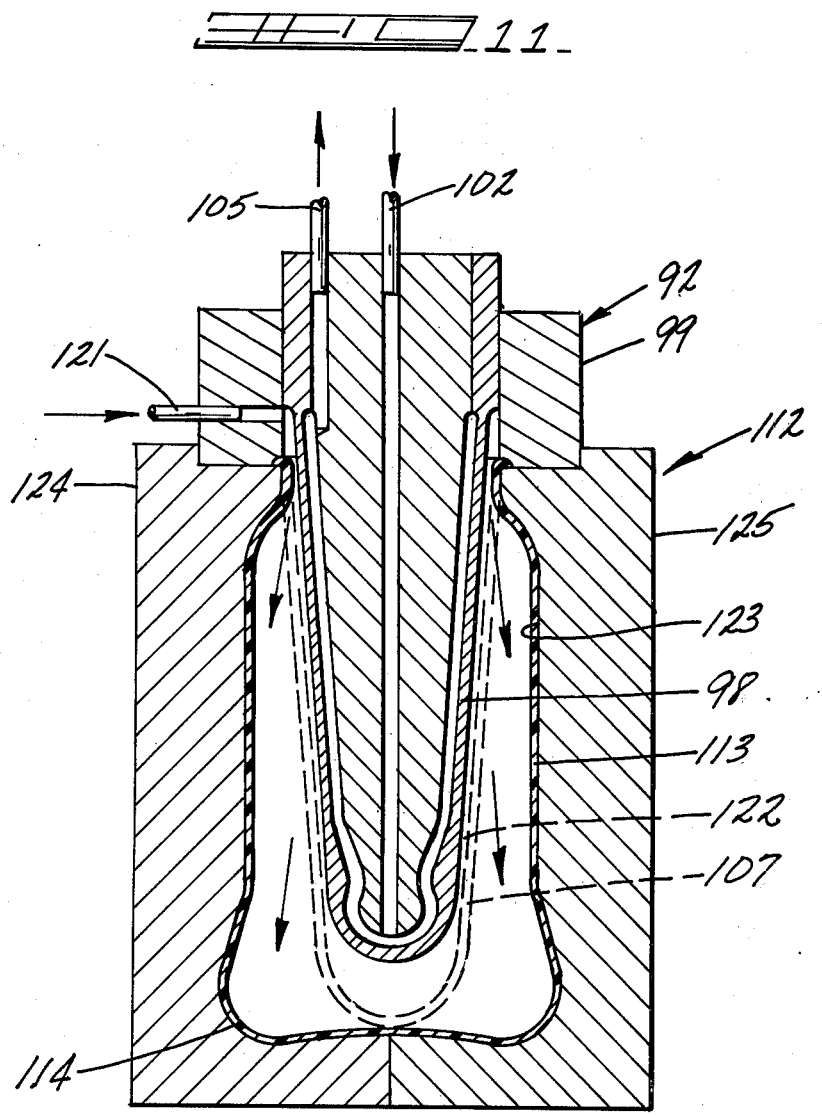

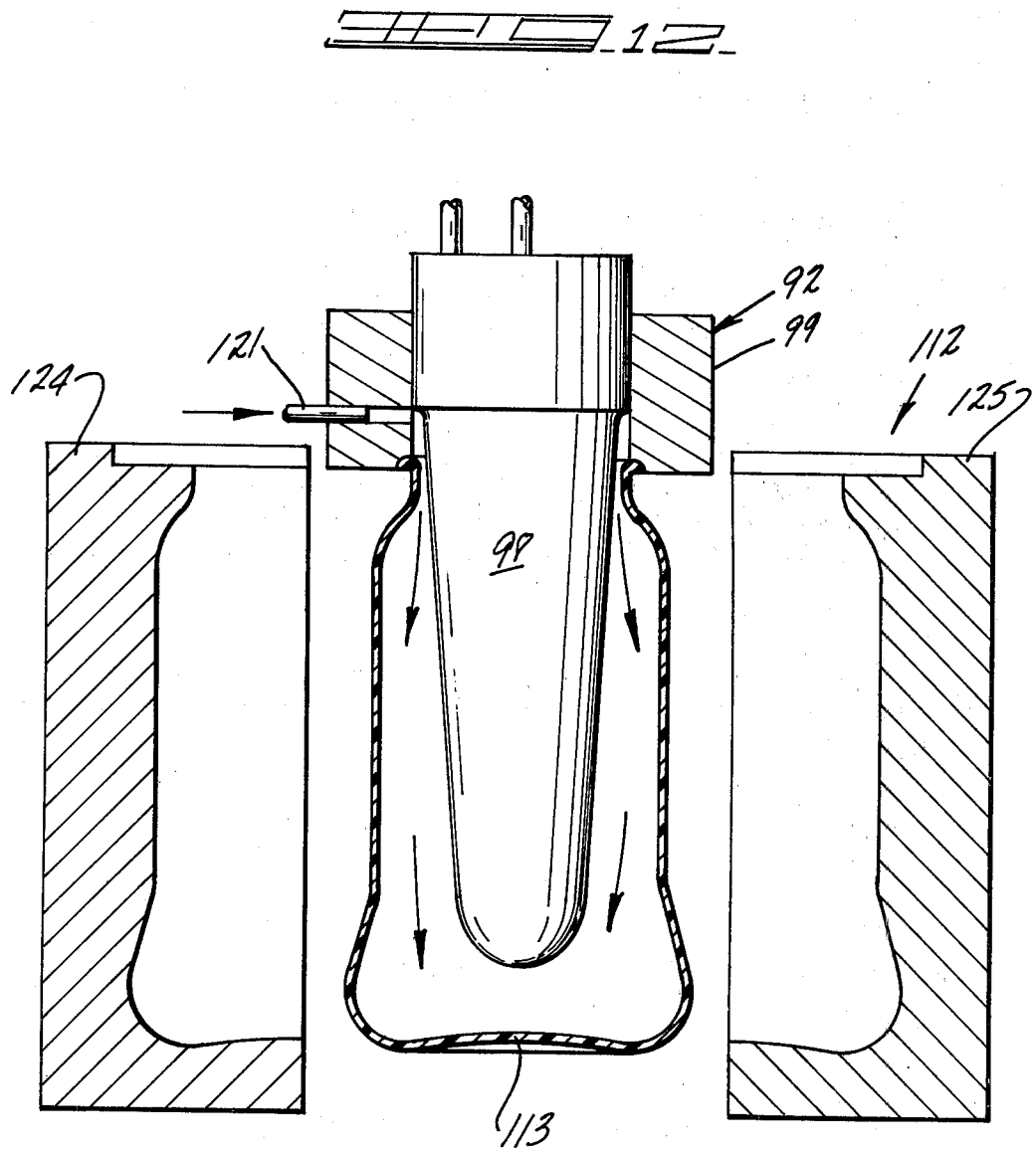

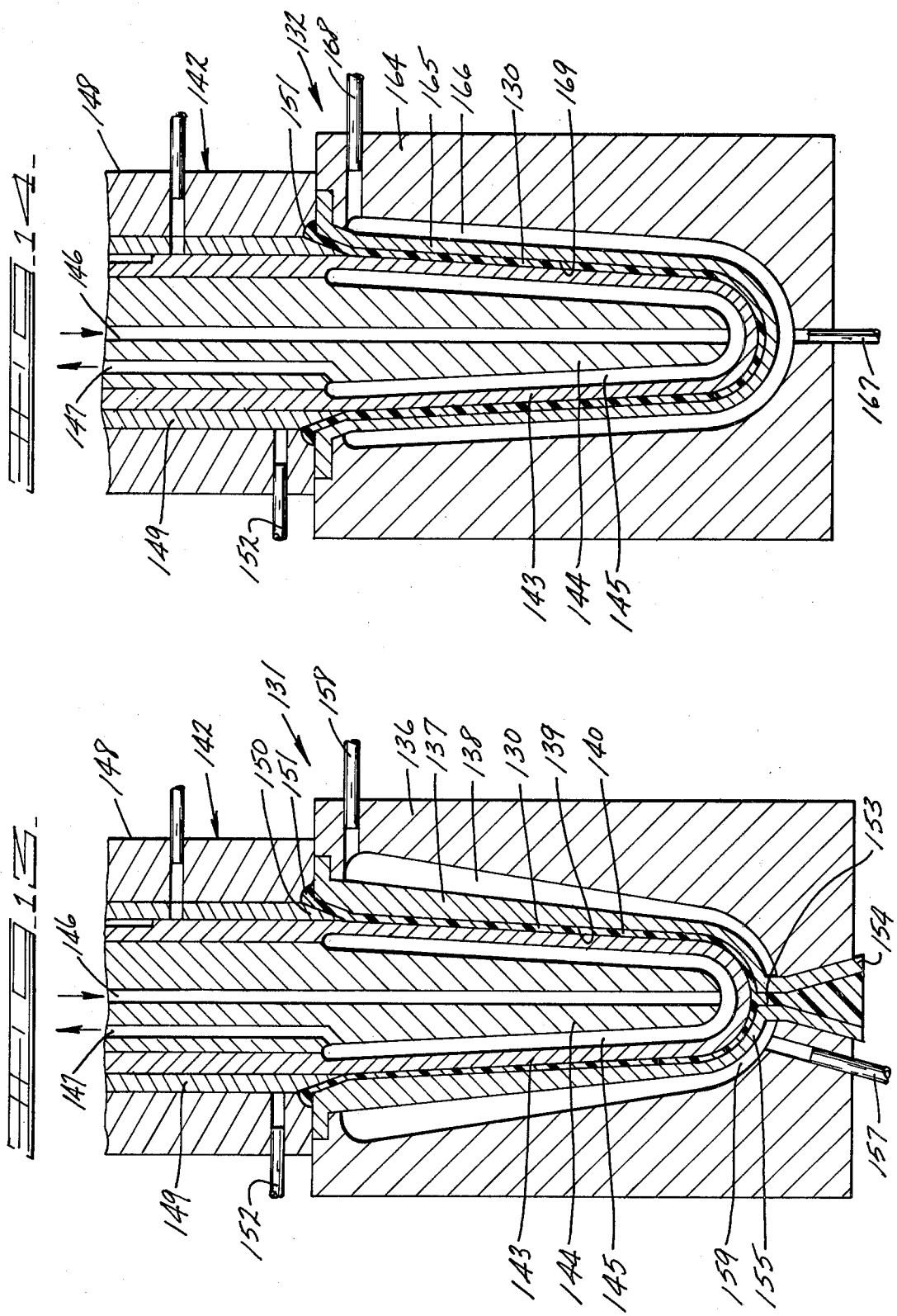

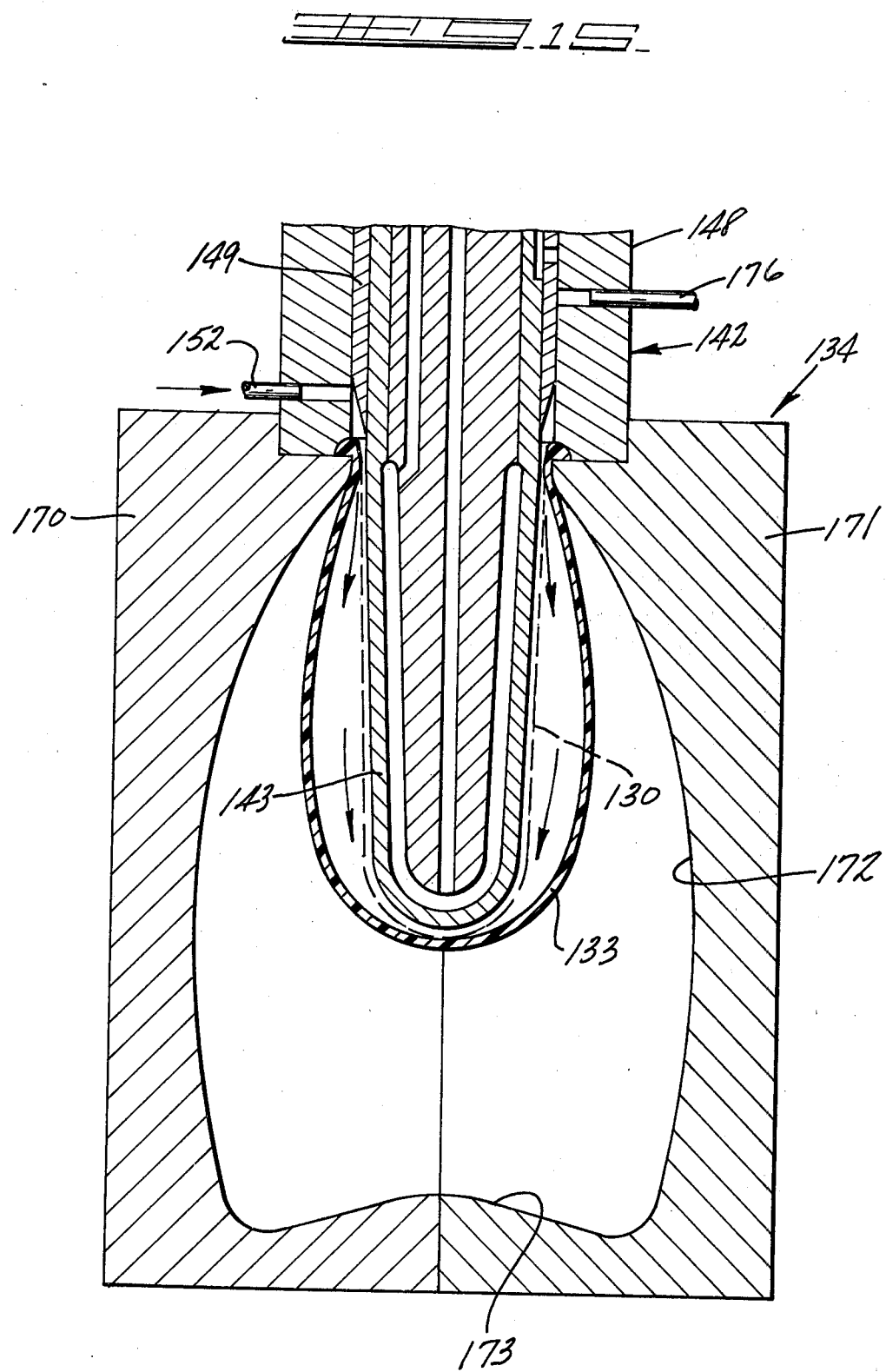

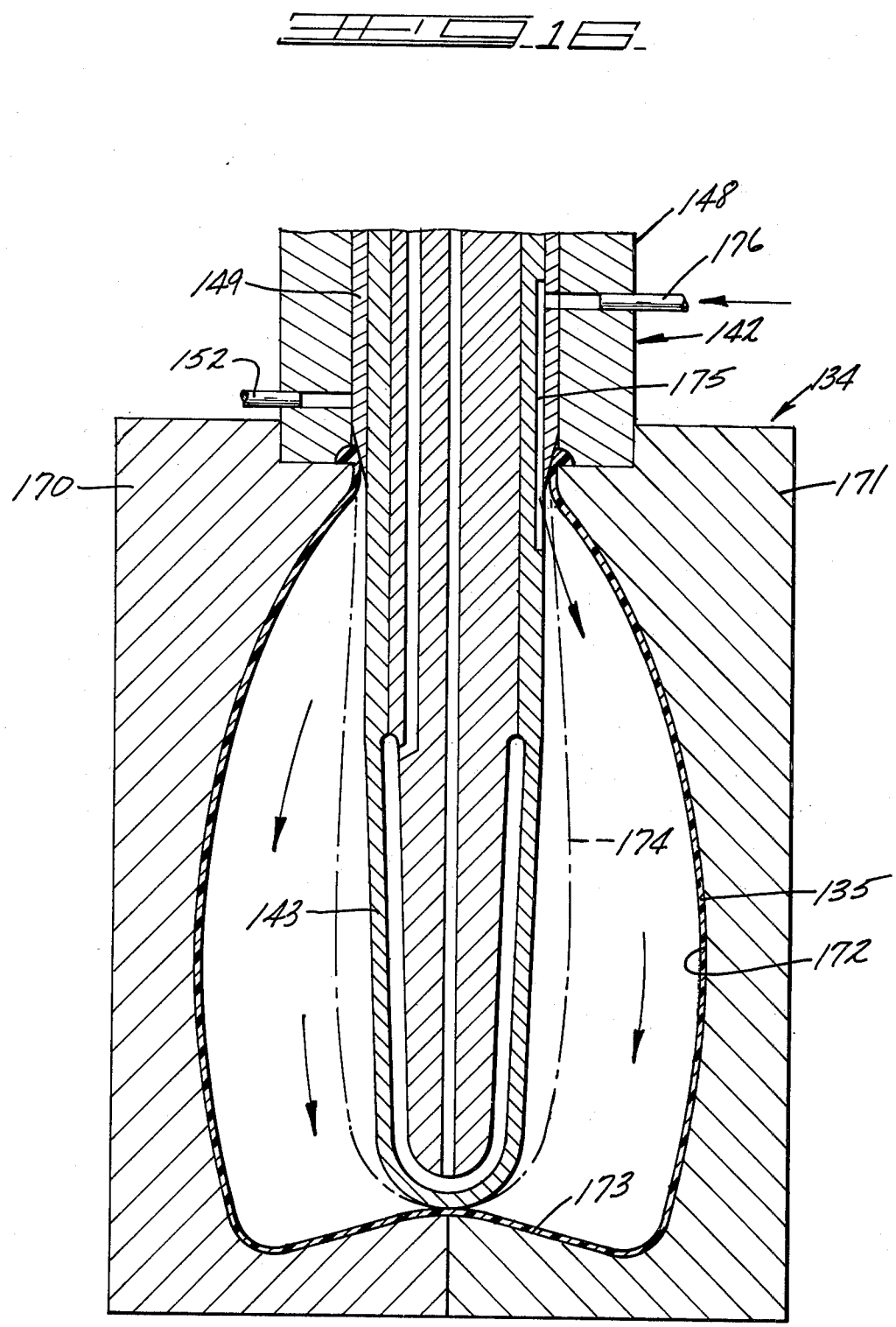

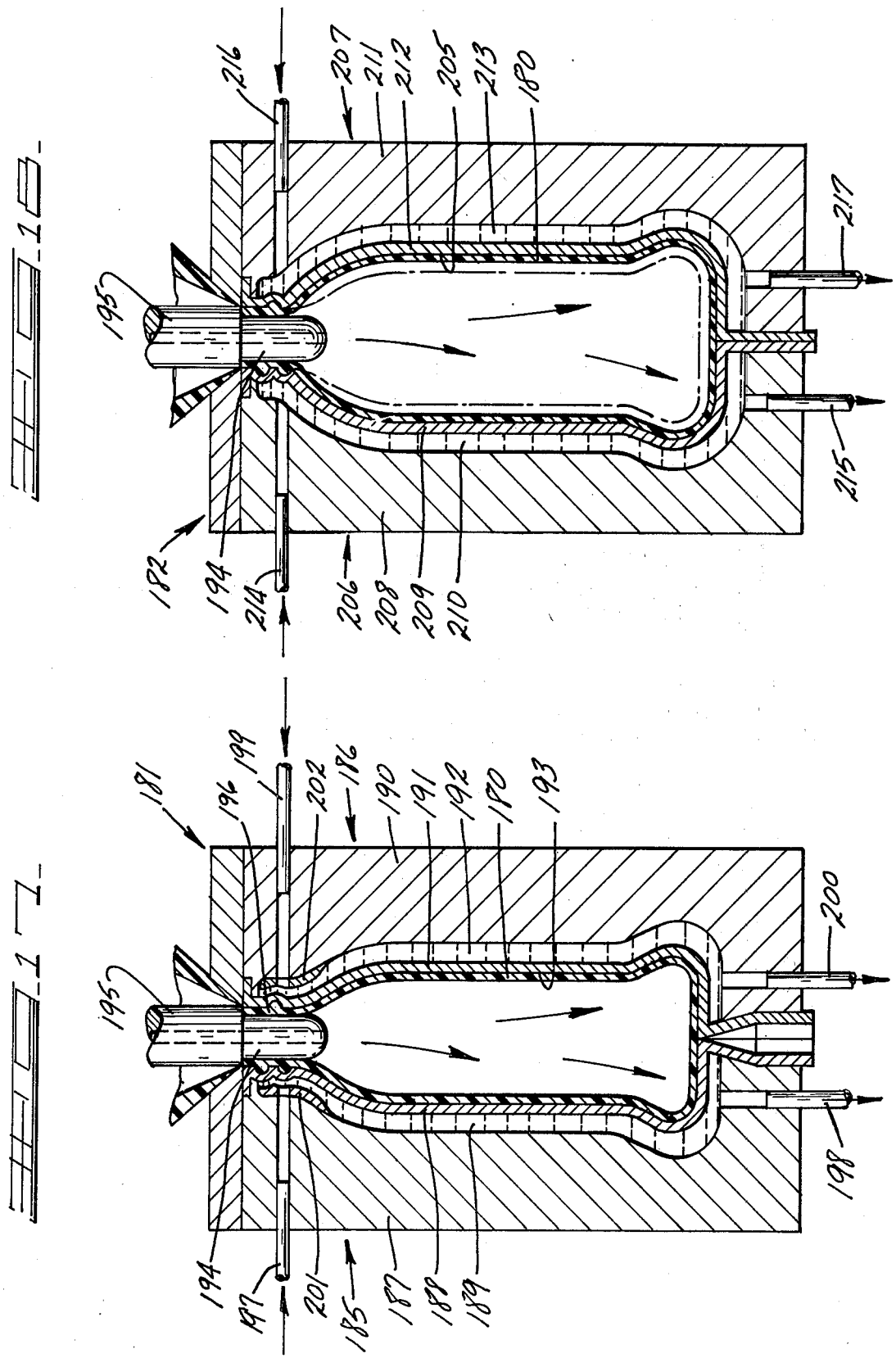

METHOD FOR THERMAL CONDITIONING A THERMOPLASTIC PARISON

This is a division of application Ser. No. 748,002 filed Dec. 6, 1976, now U.S. Pat. No. 4,087,227.

BACKGROUND OF THE INVENTION

This invention relates to blowing articles from a thermoplastic material and more particularly to an improved shell mold and method for thermal conditioning a thermoplastic parison prior to blow molding the parison into a hollow finished article.

Bottles and other hollow articles are sometimes blown from thermoplastic materials such as polypropylene, polyethylene, polyethylene terephthalate and polyvinyl chloride. As an initial step in manufacturing a bottle, a parison is formed either by free extruding a mass of the thermoplastic material into a hollow tube and subsequently blowing the extrusion in a preform mold, or by injection molding. When the parison is extruded, variations in wall thickness may be achieved by programming the extrusion nozzle to provide additional glass at locations which are stretched the most during the final molding steps. The parison is then transferred to a blow mold cavity where it is expanded by blowing into contact with the mold. By cooling the parison to a uniform temperature between the crystalline freezing point and the melting point of the material prior to blowing, the material becomes biaxially oriented as it is stretched during blowing. The degree of orientation increases as the temperature of the material during stretching approaches an optimum value. As a consequence, it is desirable to maintain the parison at a uniform temperature close to the optimum value to achieve uniformly high biaxial orientation in the blown bottle or other container. Biaxial orientation requires at least some stretching in two directions. When a parison is blown or inflated into a bottle, the sides are stretched in two directions. Orientation in the side walls of the bottle can be increased by stretching the parison by extending a plunger through a preformed bottle neck after the parison is inserted into the final blow mold, either prior to or simultaneously with blowing.

It has been recognized that the temperature history of the parison must be carefully controlled prior to blowing in the final blow mold to achieve optimum orientation and/or uniform wall thickness. The time of retention of the thermoplastic material in the preform mold and the time of transfer of the preformed parison to the final blow mold for blowing are all carefully correlated with the wall thickness of the preformed parison and of the final article and with the material utilized in the operation, so that the final blowing is accomplished under conditions most conductive to orientation. The thermal history of the parison prior to blowing is also critical for controlling the final wall thickness in the finished article. For materials such as polyvinyl chloride, the final thickness of the oriented material is extremely sensitive to thermal variations prior to stretching. For typical blow molding stretch ratios, a thickness variation of 50% or more can be expected to result from a 5° F. temperature non-uniformity. The thickness variations of the final bottle resulting from the thermal non-uniformities in the preformed parison become progressively worse as the degree of stretch by blow out or plunger stretch is increased with other factors or functions remaining unchanged.

The prior art has suggested zone cooling as a method for thermal conditioning a preform. In the case of an extruded preform, the zone cooling takes place in the preform mold where the parison is held for a short time after blowing. For an injection molded parison, the zone cooling takes place either in the injection mold or in a preform mold, or both. However, zone cooling has required a complicated mold with a large number of fluid connections for circulating different temperature cooling fluids through different passages formed in the mold. For a two piece mold having four different cooling zones, sixteen separate fluid connections are required since a separate fluid inlet and outlet must be provided for each zone in each mold half. A problem with prior art zone cooling techniques occurs when it is necessary to change the location of any cooling zone. This has required the construction of a new mold in most cases, resulting in a high expense. This is of particular importance because the optimum locations for the different zones are determined primarily through trial and error techniques.

SUMMARY OF THE INVENTION

According to the present invention, an improved mold and method are provided for thermal conditioning a thermoplastic parison prior to blow molding the parison into a finished hollow article. The mold is adapted for providing different thermal zones for controlling the thermal history of the various portions of the parison. Thermal conditioning occurs in a novel shell mold in which the rate of heat conduction between the parison and a heat transfer fluid is controlled. For an extruded parison, the mold consists of two mold halves which define a mold cavity therebetween and which are separable to permit removal of the parison from the mold cavity. Each mold half includes an outer shell and an inner shell which define therebetween a passageway through which a heat transfer fluid is circulated. The inner shell in each mold half defines one half of the mold cavity. In one embodiment, heat transfer between the parison and the heat transfer fluid is controlled by varying the thickness of the inner shell. The inner shell is provided with thicker wall portions adjacent portions of the parison from which less BTUs of heat are to be conducted and thinner wall portions where a greater heat transfer rate is required. In another embodiment, the size or cross sectional area of the heat transfer fluid passage is varied to control turbulence and flow velocity of the heat transfer fluid. By restricting the fluid passages, the flow velocity increases to in turn increase the cooling rate for the portion of the parison contacting the inner shell mold adjacent the restriction. Conversely, an enlargement in the fluid passages decreases the flow velocity to in turn decrease the heat transfer rate.

When the preform in injection molded, the two mold halves are replaced with a one piece inner mold shell and a one piece outer mold shell and, also, a shell core may be used for controlling the temperature history at the inner walls or surfaces of the molded preform. Thermal zones are established by varying of thickness or the composition of an outer core shell and/or by varying the flow velocity of a heat transfer fluid circulated through passages in the core. In the past, it was not practical to provide zone controlled cooling in the core of a parison injection mold due to the number of individual fluid passages required within the limited available space in the core.

Accordingly, it is an object of the invention to provide an improved shell mold and method for thermal conditioning a thermoplastic parison prior to blow molding the parison into a finished hollow article.

Another object of the invention is to provide a shell mold for a thermoplastic parison having a plurality of thermal zones for different heat transfer rates between the parison and a circulated heat transfer fluid.

Another object of the invention is to provide an improved shell mold and method for zone controlling the thermal history of a thermoplastic parison to in turn control the final wall thickness of an article blow molded from the parison.

Still another object of the invention is to provide an improved shell mold and method for controlling the thermal history of a thermoplastic parison to control the degree of biaxial orientation when the parison is blow molded at orientation temperatures into a finished hollow article.

Other objects and advantages of the invention will become apparent from the following detailed description, with reference being made to the accompanying drawings.

BRIEF DESCRIPTION OF THE DRAWINGS

FIG. 1 is a vertical cross sectional view through a parison shell mold constructed in accordance with a first embodiment of the invention for preforming and thermal conditioning an extruded parison;

FIG. 2 is a cross sectional view taken along line 2—2 of FIG. 1;

FIG. 7 is a vertical cross sectional view through a modified shell mold for preforming and thermal conditioning a parison prior to expanding the parison into a biaxially oriented hollow article;

FIG. 8 is an exploded vertical cross sectional view through a shell mold and shell core for injection molding and thermal conditioning a parison in accordance with a modified embodiment of the invention;

FIG. 9 is a vertical cross sectional view through the assembled shell mold and shell core of FIG. 8 showing an injection molded parison positioned therein;

FIG. 10 is a vertical cross sectional view through the parison and the injection mold core from FIG. 9 during transfer into a final blow mold;

FIG. 11 is a vertical cross sectional view through the injection molded parison and the mold core positioned within a final blow mold and showing expansion into a finished article;

FIG. 12 is a vertical cross sectional view through the final blow mold of FIG. 11 showing the ejection of a finished hollow article;

FIG. 13 is a vertical cross sectional view showing a parison injection molded and thermally conditioned within a mold constructed in accordance with a modified embodiment of the invention;

FIG. 14 is a vertical cross sectional view through the injection mold core and the molded parison showing the parison of FIG. 13 positioned within an intermediate thermal conditioning mold;

FIG. 15 is a vertical cross sectional view showing the initial stage of expanding the injection molded parison in a final blow mold into a biaxially oriented hollow article;

FIG. 16 is a vertical cross sectional view through the mold of FIG. 15 showing the parison stretched and blown into a finished biaxially oriented hollow article;

FIG. 17 is a vertical cross sectional view through a further modified embodiment of a parison mold constructed in accordance with the present invention;

FIG. 18 is a vertical cross sectional view showing the preformed parison from FIG. 17 in an intermediate thermal conditioning mold.

DESCRIPTION OF THE PREFERRED EMBODIMENTS

Figure 3:
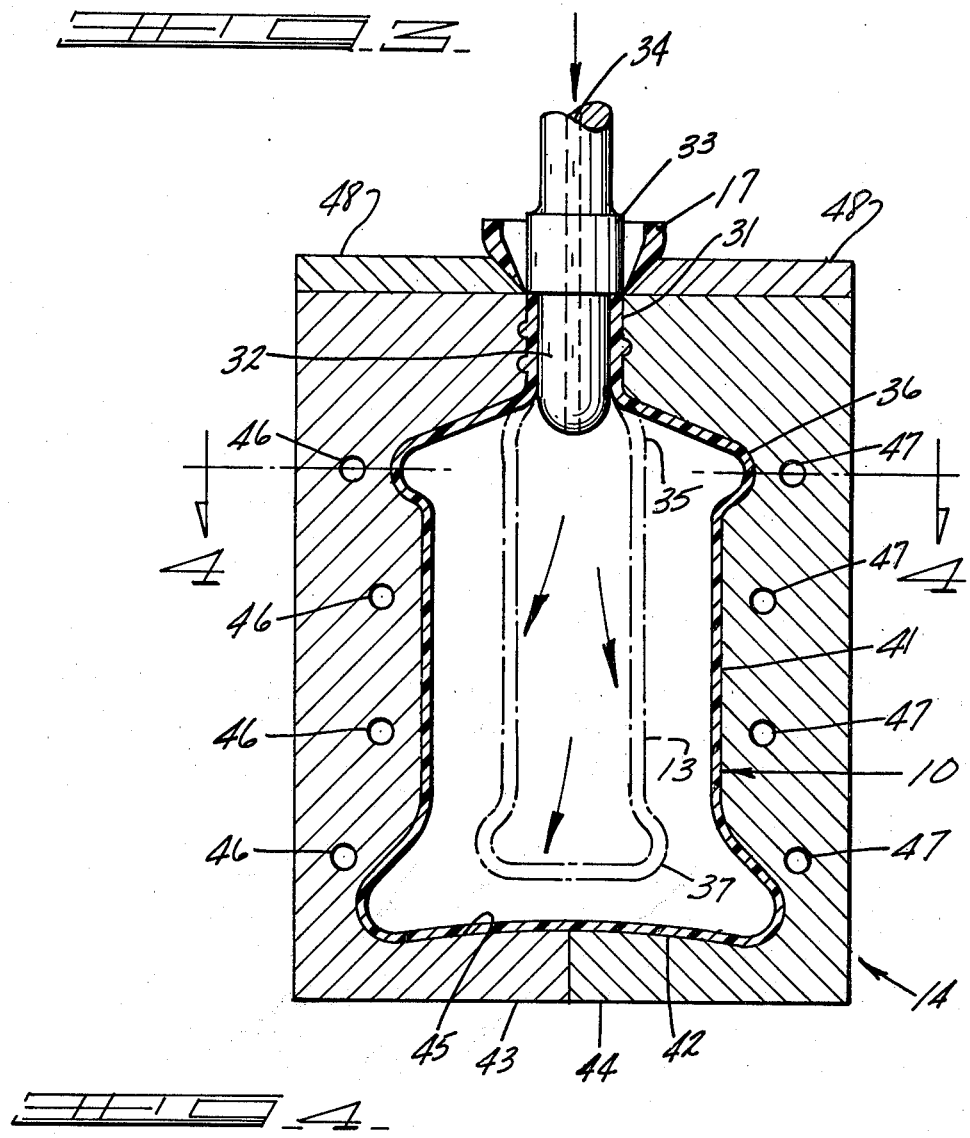
FIG. 3 is a vertical cross sectional view through a final blow mold for blowing the preformed parison from the mold of FIG. 1 into a finished hollow article.
Figure 4:
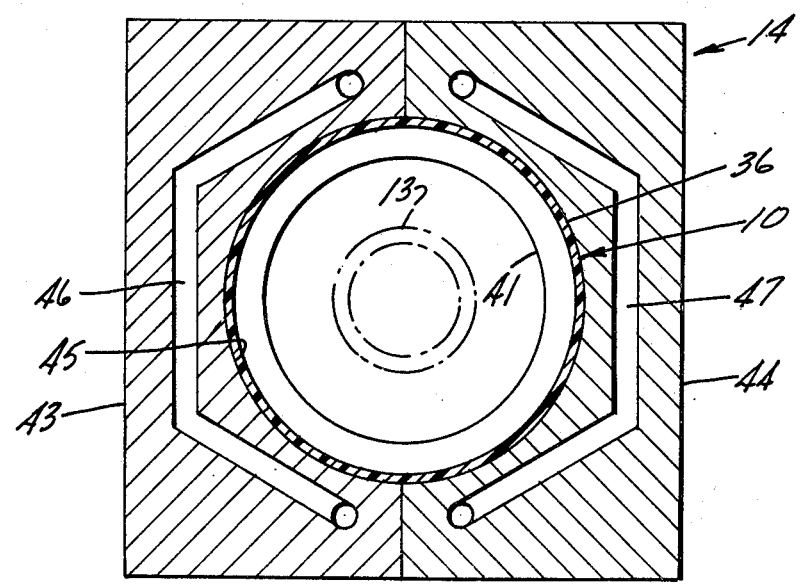
FIG. 4 is a cross sectional view taken along lone 4—4 of FIG. 3.

Turning now to the drawings and particularly to FIGS. 1-4, a first embodiment of the present invention is illustrated for blowing a biaxially oriented bottle 10 from a hollow, tubular extruded parison 11. FIGS. 1 and 2 illustrate a shell mold 12 constructed in accordance with the present invention for shaping the extruded parison 11 into a preform 13 and for thermally conditioning the preform 13, while FIGS. 3 and 4 illustrate a final mold 14 in which the thermally conditioned preform 13 is blown into the finished bottle 10.

The parison 11 is initially in the form of a softened tube formed from a thermoplastic material capable of orientation, such as essentially crystalline polymers and amorphous polymers. Typical materials capable of orientation include polyvinyl chloride, polystyrene, polypropylene and polyethylene terephthalate. After the parison 11 is extruded in a conventional manner, it is transferred into the shell mold 12 by closing two mold halves 15 and 16 over the parison 11. The parison 11 is extruded with excessive material such that a flared upper end 17 extends above the shell mold 12 and a tail 18 extends below the shell mold 12. This assures that the parison 11 positioned within the shell mold 12 contains a uniform and complete charge of the softened thermoplastic material for each successive parison transferred into the shell mold 12. The tail 18 is removed prior to transferring the preform 13 to the final blow mold 14.

The mold half 15 includes an outer shell 19 and an inner shell 20 which define a fluid passageway 21 therebetween and the mold half 16 includes a similar outer shell 22 and an inner shell 23 which define a fluid passageway 24 therebetween. A fluid inlet 25 and a fluid outlet 26 communicate with opposite ends of the passageway 21 and a fluid inlet 27 and a fluid outlet 28 communicate with opposite ends of the passageway 24 for circulating a heat transfer fluid such as oil, water, or air around the inner shells 20 and 23. Under normal operation of the shell mold 12, the circulated heat transfer fluid provides cooling to the inner mold shells 20 and 23, although it should be appreciated that a heated fluid may be circulated through the passageways 21 and 24 for transferring heat to the inner mold shells 20 and 23 when desired.

The shell mold 12 performs several functions which permit eventually blowing a finished bottle 10 having biaxially oriented walls which are of a substantially uniform thickness. When the mold halves 15 and 16 are positioned together, the inner mold shells 20 and 23 define a cavity 29 in which the extruded parison 11 is positioned. An upper end 30 of the cavity 29 has an internally threaded surface for molding a neck portion 31 on the preform 13, which remains as the neck portion 31 on the finished bottle 10. After the mold sections 15 and 16 are closed upon the extruded parison 11, a blow tube 32 on a blow head 33 is inserted through the upper end of the parison 11 to force the parison 11 outwardly into the threaded cavity end 30 for molding the bottle neck 31. A pressurized gas such as air is then injected through a passage 34 through the blow head 33 for expanding the parison 11 into contact with the cavity 29, thereby forming the preform 13. As the parison 11 is expanded into contact with the inner mold sections 20 and 23, the thermoplastic material is cooled by conduction through the inner mold sections 20 and 23 and the heat is carried off by the heat transfer fluids circulated through the passages 21 and 24. The temperature of the circulated heat transfer fluid and the time which the preform 13 is allowed to soak in the mold 12 are carefully regulated to cool each surface area of the preform 13 to an optimum orientation temperature. It may be desirable to cool the preform 13 to a temperature slightly above the optimum orientation temperature since additional cooling may occur when the preform 13 is transferred into the final blow mold 14.

The degree of biaxial orientation in the finished bottle 10 is controlled by various factors. Other factors being equal, portions of the bottle 10 which are stretched the most during the final blowing operation will tend to have a higher degree of orientation than portions of the bottle which are stretched to a lesser degree. It is also known that as the temperature of the preform 13 deviates above the optimum orientation temperature, there will be a decrease in the degree of orientation in the finished bottle 10. To maintain a uniform degree of orientation throughout the bottle 10 and/or to achieve a uniform wall thickness in the bottle 10, it is sometimes desirable to maintain portions of the preform 13 which are stretched the most during the blowing process at slightly higher temperatures than portions of the preform 13 which are stretched by a lesser amount. From a comparison of the cross sectional views of FIGS. 1 and 3, it will be noted that the preform 13 has a shoulder 35 adjacent the neck 31 which is stretched into a shoulder 36 on the finished bottle 10 and has a heel 37 which is stretched into a heel 38 on the finished bottle 10. The shoulder 35 and the heel 37 are stretched considerably more than the remainder of the preform 13 during the final blowing operation in the blow mold 14. In accordance with the embodiment of the present invention illustrated in FIGS. 1-4, the shell mold 12 is adapted to maintain the shoulder 35 and the heel 37 of the preform 13 at slightly higher temperatures than the remainder of the preform 13 to facilitate obtaining a uniform degree of orientation and/or a uniform wall thickness in the bottle 10. The slightly higher temperatures also assume that the preform 13 will expand to completely fill the mold 14 when the bottle 10 is blown. Heat transfer from the preform shoulder 35 and heel 37 is restricted by limiting the rate of heat transfer through the portions of the inner mold shells 20 and 23 adjacent these portions of the preform 13. The inner shells 20 and 23 are formed by conventional methods, such as electroforming. Nickel, or some other suitable mold material, is plated onto a model and then separated from the model to form the inner mold shells 20 and 23 to accurately define the cavity 29. An additional mass of metal 39 is built up on the exterior surface region of the inner mold shells 20 and 23 adjacent the preform shoulder 35 and an additional mass of metal 40 is built up on the exterior surface region of the inner mold shells 20 and 23 adjacent the preform heel 37. The additional masses of metal 39 and 40 greatly increase the heat transfer paths from the preform shoulder 35 and heel 37 to the heat transfer fluid circulated through the passages 21 and 24. The metal or other suitable material from which the built up portions 39 and 40 are formed may be of the same material as the mold shells 20 and 23 or may be of a material having a lower thermal conductivity than the material from which the inner mold shells 20 and 23 are formed to further decrease the heat transfer rate. By selecting a material having a lower thermal conductivity, the thickness to which the portions 39 and 40 are built up is reduced. By limiting the soaking time in which the preform 13 is maintained in contact with the walls of the cavity 29 defined by the inner mold shells 20 and 23, the preform shoulder 35 and the heel 37 will have a higher temperature than the remainder of the preform 13. The temperature is maintained slightly higher at these points so that when the preform 13 is expanded into the shape of the finished bottle 10, the degrees of biaxial orientation throughout the shoulder 36, a side 41 and the heel 38 of the finished bottle 10 are substantially uniform.

As shown in FIGS. 3 and 4, the final blow mold 14 includes two mold halves 43 and 44 which define an interior cavity 45 having the shape of the finished bottle 10. The mold halves 43 and 44 are separable to permit insertion of the preform 13 into the cavity 45 and ejection of the finished bottle 10. A plurality of interconnected passages 46 are provided within the mold half 43 and a plurality of interconnected passages 47 are provided within the mold half 44. Heat transfer fluid is circulated through the passages 46 and 47 for cooling the mold halves 43 and 44 to a temperature appreciably below the crystalline temperature of the material from which the bottle 10 is blown. After the bottle 10 is blown by injecting air through the blow tube 32 on the blow head 33 to expand the preform 13 into contact with the walls of the cavity 45 and the bottle 10 has cooled, the mold sections 43 and 44 are separated to eject the finished bottle 10. A puff of air through the blow tube 32 is sufficient to separate the bottle 10 from the blow tube 32. Plates 48 attached to the top of the mold 14 retain the flared waist end 17 which initially formed the upper end of the parison 11 when the parison 11 was inserted into the shell mold 12.

FIGS. 1-4 have illustrated an embodiment of the invention in which a free extruded parison formed from a thermoplastic material is initially blow molded in a preforming mold and thermally conditioned by zone cooling and, subsequently, is transferred to a conventional blow mold where it is blown into a finished hollow article. Heat transfer fluid is circulated through the preform shell mold sections at substantially constant flow rates and zone cooling is achieved solely by providing different wall thicknesses in the inner mold shell. Only one fluid inlet and one fluid outlet are required for each mold half 15 and 16 for circulating heat transfer fluid through the single passage in each mold half. In prior art zone cooled molds having four separate zones for cooling the neck, shoulder, side and heel of a preform at four separate rates, sixteen hoses and four separate fluid temperature controllers were required for maintaining four separate zones in each mold half. As a consequence, there is considerable savings in the present invention which controls the heat transfer rate between the preform and a single circulated heat transfer fluid for providing multiple zone differential cooling.

Figure 5:
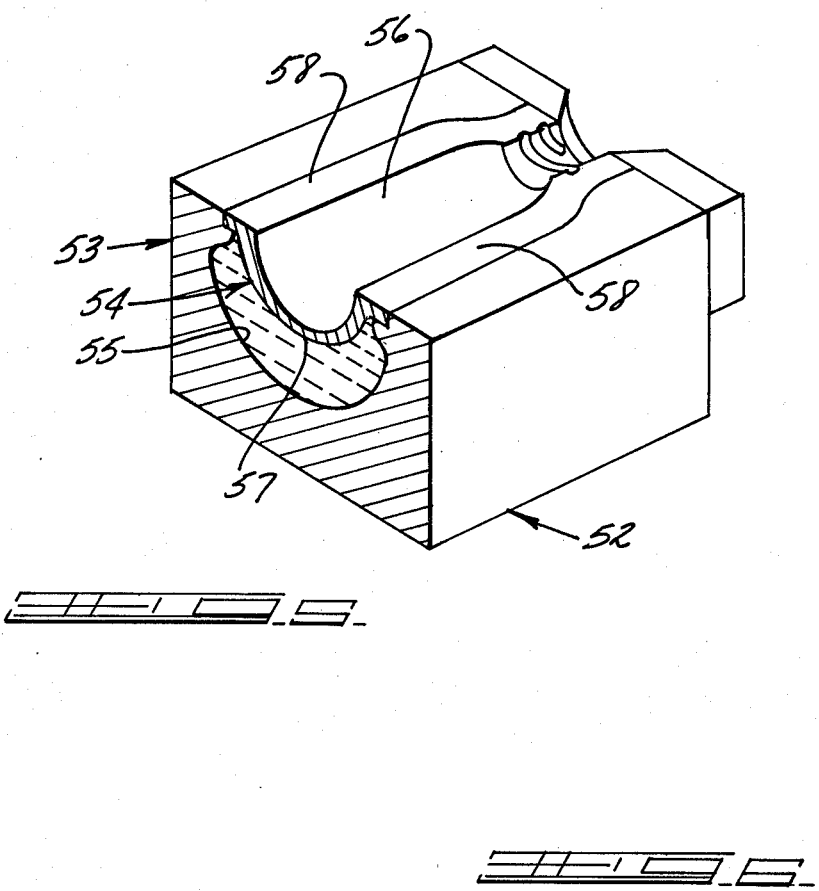
FIG. 5 is a fragmentary cross sectional view through one half of a parison shell mold constructed in accordance with the present invention.
Figure 6:
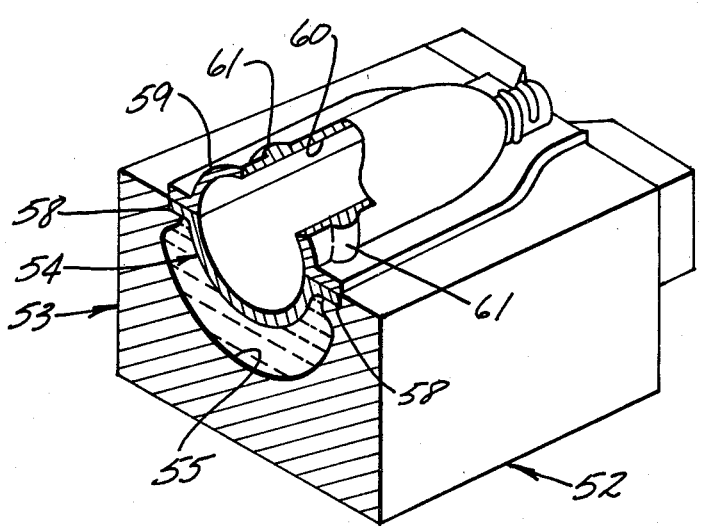
FIG. 6 is a fragmentary cross sectional view through a portion of a parison shell mold constructed in accordance with the present invention.

FIGS. 5 and 6 are fragmentary perspective views illustrating the typical construction of a preform shell mold half 52. The preform shell mold half 52 includes an outer shell 53 and an inner shell 54 which define therebetween a single passageway 55 through which a heat transfer fluid is circulated. The inner shell 54 has an inner surface 56 which is shaped to define one half of a mold cavity and an outer surface 57 which defines one side of the fluid passageway 55. Flanges 58 extend along opposite edges of the inner shell 54 and are sealed to the outer shell 53 for supporting the inner shell 54 and for retaining the heat transfer fluid within the passageway 55. FIG. 6 is similar to FIG. 5 and further shows a fragment of an inner mold shell 59 from a second mold half positioned in alignment with the inner mold shell 54. The two inner mold shells 54 and 59 define a mold cavity 60 for shaping and thermally conditioning a parison. An annular ridge 61 formed from a metal or other suitable material is shown built up on the exterior surface of the inner mold shell 59. The ridge 61 reduces the heat transfer rate through the adjacent portion of the mold shell 59 for in turn decreasing the heat transfer rate between the abutting portion of a parison located within the mold cavity 60 and a circulated heat transfer fluid. It should be appreciated from viewing FIG. 6 that the location and size of the ridge 61 is readily changed to permit correcting or modifying the heat transfer rate from a molded parison by trial and error. Thus, if the ridge 61 is not properly located, it may be readily removed from the mold shell 59 and a different ridge may be built up to a desired size at a preselected location on the exterior of the mold shells 54 and 59. Or, if the heat transfer rate adjacent the ridge 61 is too low or too high, the ridge 61 may be either ground down or built up to modify the heat transfer rate. Generally, considerable trial and error modification is required to achieve an optimum mold design since the results of increasing or decreasing the heat transfer rate between various zones of the preform and the circulated fluid are not always predictable. After a mold shell is designed and modified as necessary by trial and error, the resulting shell may be used for producing a cast which is in turn used for reproducing such mold shell. The resulting mold shells will then perform identically for providing reproducable thermal histories on parisons shaped and conditioned therein. When the molds are subsequently used, there are only two production variables which need be controlled, namely, the temperature of the oil or other heat transfer fluid and the soaking time of the preform in the mold. As the temperature of the heat transfer fluid is changed, the same thermal zones will appear on the parison. Only the overall temperature of the parison will be affected. Therefore, production adjustments are considerably simpler than prior art techniques in which heat transfer fluid to each of a plurality of different zones had to be individually adjusted and maintained at constant temperatures for achieving uniform production.

FIG. 7 is a vertical cross sectional view showing a modified shell mold 65 for shaping and thermal conditioning an extruded thermoplastic parison into a preform 66. The shell mold 65 includes two mold halves 67 and 68. The mold half 67 includes an outer shell 69 and an inner shell 70 and the mold half 68 includes an outer shell 71 and an inner shell 72. The inner shells 70 and 72 cooperate for defining a cavity 73 for blow molding the preform 66 from an extruded parison. A passage 74 is formed between the outer mold shell 69 and the inner mold shell 70 and a passage 75 is formed between the outer mold shell 71 and the inner mold shell 72 for circulating a heat transfer fluid around the inner mold shells 70 and 72. A fluid inlet 76 and a fluid outlet 77 are connected to opposite ends of the passageway 74 and a fluid inlet 78 and a fluid outlet 79 are connected to opposite ends of the passageway 75. Heat transfer fluid is circulated at a controlled temperature from a suitable source (not shown) to the fluid inlets 76 and 78 and is returned to the source from the fluid outlets 77 and 79. Differential or zone controlled cooling is provided so that a shoulder region 80 and a heel region 81 on the preform 66 which are stretched the most during final blow molding are maintained at slightly higher temperatures than a molded bottle neck 82 and a side region 83 which is stretched to a lesser degree during the final blow molding. Two techniques are used for providing zone control over the cooling rate for the preform 66. As in the embodiment shown in FIG. 1, a mass 84 of metal or other suitable material is built up on the exterior surface regions of the inner shell molds 70 and 72 which are adjacent the shoulder 80 and a similar mass 85 of metal is built up on the exterior surface regions of the inner mold shells 70 and 72 adjacent the portion which forms the heel region 81. The masses 84 and 85 increase the heat conduction path between the adjacent portions of the preform 66 and the circulated heat transfer fluid to decrease the rate of heat transfer from these portions of the preform 66.

The cooling rate for the preform 66 is modified further by controlling the velocity at which the heat transfer fluid flows past various portions of the inner mold shells 70 and 72. This is accomplished by varying the cross sectional area of the passages 74 and 75 in the flow direction. As the cross sectional area of the passages increases, the velocity of the flow will decrease and the fluid will become more turbulent. This in turn decreases the rate at which heat is removed from the adjacent portions of the preform 66. Conversely, as the cross sectional area of the passages 74 and 75 decreases, the velocity of the fluid increases to increase the rate at which heat is carried off from the adjacent portions of the preform 66. The portion of the passages 74 and 75 which extend along the side region 83 of the preform 66 are constricted to increase the fluid flow velocity and, thereby, to increase the heat transfer rate from the side region 83 of the preform 66. On the other hand, the portions of the passageways 74 and 75 adjacent the shoulder region 80 and the heel region 81 of the preform 66 are enlarged to decrease the fluid flow velocity and, thereby, to decrease the rate at which heat is carried off from these regions of the preform 66. The passages 74 and 75 may be constricted either by contouring the interior surfaces of the mold halves 69 and 71 or by adding masses 86 of metal to build up the interior surface of the outer mold shells 69 and 71 to form constricted areas in the passageways 74 and 75.

FIGS. 8-12 illustrate the application of the present invention for thermal conditioning an injection molded parison prior to blowing the parison into a hollow finished article, such as a bottle. FIG. 8 illustrates a parison injection mold 90 which includes an exterior mold portion 91 and a core 92. The exterior mold section 91 consists of an inner mold shell 93 mounted within an outer mold shell or support 94. A passageway 95 is defined between the inner and outer mold shells 93 and 94. A suitable heat transfer fluid, such as oil or water, is circulated from a fluid inlet 96 through the passageway 95 to a fluid outlet 97 for controlling the temperature of the inner mold shell 93.

The core 92 includes an outer mold shell 98 mounted in a carrier 99. A central member 100 is positioned within the outer mold shell 98. A passageway 101 is defined between the outer mold shell 98 and the central member 100. A temperature controlled heat transfer fluid is circulated from an inlet 102 in the central member 100 through a passageway 103 which extends down the center of the central member 100 to a lower end 104 and then upwardly through the passageway 101 to an outlet 105. The circulated heat transfer fluid maintains the outer mold shell 98 at a predetermined temperature.

As best seen in FIG. 9, the outer mold shell 98 of the core 92 is adapted to fit within the inner mold shell 93 of the exterior mold section 91 to define a cavity or chamber 106 in which a parison 107 is injection molded. The parison 107 is molded by injecting softened thermoplastic resin through an orifice 108 in a gate 109 which is formed integrally with the inner mold shell 93 and is located to extend through a lower end 110 of the outer mold shell 94. As the thermoplastic material is injected through the orifice 108 at high pressures, it flows upwardly until it completely fills the cavity 106. The upper end of the cavity 106 is shaped to form a rim 111 on the molded parison 107. Since all of the thermoplastic material forming the parison 107 flows through the orifice 108 in the gate 109, the region adjacent the gate 109 will tend to be hotter than other regions of the inner mold shell 93. The heat transfer fluid inlet 96 is located adjacent the gate 109 since fluid entering the inlet 96 is cool while the fluid outlet 97 is located near the rim 111 since the fluid will have been heated prior to reaching the cooler rim area. Similarly, the heat transfer fluid circulated through the core 92 for cooling the outer core shell 98 flows from adjacent the lower end 104 of the central member 100 which is near the hot gate 109 upwardly along the outer core shell 98 to the outlet 105 adjacent the rim 111.

After the thermoplastic material is injected into the cavity 106 to mold the parison 107, the parison 107 is left within the cavity 106 for a predetermined period of time for thermal conditioning. The period of time in which the parison 107 soaks within the parison mold 90 and the temperature of the heat transfer fluid circulated through the exterior mold section 91 and the core 92 are controlled such that the thermoplastic material is biaxially oriented when the parison 107 is transferred into a final blow mold 112 (FIG. 11) and blown into a finished bottle 113. It will be noted from FIG. 11 that the bottle 113 is irregular in shape and has an enlarged diameter lower end or heel 114. The parison 107 is stretched to a greater extent to form the lower end 114 than to form the other portions of the bottle 113. To facilitate this greater expansion and also to help provide a uniform degree of biaxial orientation in the finished bottle 113, the parison 107 is thermally conditioned in the mold 90 to provide a slightly higher temperature in the portions of the parison 107 which form the lower bottle end 114.

Turning again to FIG. 9, it will be noted that the inner mold shell 93 is provided with a variable wall thickness which includes a lower region 115 of a predetermined wall thinness adjacent the gate 109, a thicker wall region 116 adjacent the region 115 and a uniform thin wall central region 117 between the thickened region 116 and the heat transfer fluid outlet 97. The thicker region 116 provides an increased heat transfer path for heat conducted from the adjacent portion of the parison 107 over the heat transfer path through the lower and central regions 115 and 117 which contact the remaining portions of the parison 107. Similar wall thickness variations are provided in the outer core shell in the core 92. The outer core shell 98 is provided with a predetermined thin wall region 118 opposite the region 115, a thicker wall region 119 opposite the thicker wall region 116 and a thin wall region 120 opposite the region 117 so that the interior surfaces of the parison 107 are thermally conditioned simultaneously with the exterior surfaces of the parison 107. By simultaneously contacting the exterior of the parison 107 with the inner mold shell 93 and the interior of the parison 107 with the outer core shell 98, the time required for thermal conditioning of the parison 107 is decreased and the injection molded parison 107 is more uniformly conditioned, as compared to a free extruded parison which is thermally conditioned only at the exterior surfaces.

After the parison 107 is thermally conditioned within the parison mold 90, the parison 107 and the core 92 are separated from the exterior mold section 91, as shown in FIG. 10, and transferred into the final blow mold 112, as shown in FIG. 11. During the transfer operation, the outer mold shell 98 of the core 92 is shifted upwardly in the carrier 99. This separates the outer core shell 98 from the parison 107 to prevent further thermal conditioning and also exposes a blow passage 121 in the carrier 99. When exposed, the blow passage 121 connects to a region or space 122 between the outer mold shell 98 and the parison 107. After the parison 107 and core 92 are positioned in the final blow mold 112, high pressure air is applied to the blow passage 121. This air flows into the space 122 and expands the parison 107 into contact with walls of a cavity 123 in the final blow mold 112 for completing the bottle 113. As the thermoplastic material from the parison 107 is expanded into contact with the walls of the cavity 123, the material is chilled by conventional cooling techniques and sets in the shape of the cavity 123. The mold 112, which consists of two mold sections 124 and 125, is then opened, as shown in FIG. 12, and the finished bottle 113 is ejected by a puff of air supplied through the blow passage 121. After the bottle 113 is ejected, the outer mold shell 98 is lowered in the carrier 99 to cover the blow passage 121 and the core 92 is repositioned within the exterior mold section 91 for mounting another parison. It should be noted that when the parison 107 is positioned within the final blow mold 112 and expanded into the finished bottle 113, the temperature of the parison 107 is such that at least a limited degree of biaxial orientation is achieved by the blowing operation. Biaxial orientation is substantially uniform across the bottle due to thermal conditioning within the parison mold 90. Although the thermal conditioning was achieved by varying the wall thicknesses between both the inner mold shell 93 and the outer core shell 98 and the circulated heat transfer fluids, it should be noted that the heat transfer rate may also be modified by varying the fluid flow rate of the heat transfer fluid within the passages 95 and 101.

Turning now to FIGS. 13-16, a further modified embodiment of the invention is shown incorporated into a method for forming a biaxially oriented hollow article such as a bottle. The method generally consists of injection molding a parison, thermally conditioning the parison and stretching and blowing the conditioned parison into the finished article. FIG. 13 shows the initial step in which a parison 130 is injection molded and thermally conditioned within a mold 131. In FIG. 14, the molded parison 130 is thermally conditioned further within a conditioning mold 132. FIG. 15 shows the initial expansion of the parison 130 into a shape 133 within a final blow mold 134 while FIG. 16 shows stretching and the final expansion of the shaped parison 133 into a finished hollow bottle 135.

The injection mold 131 shown in FIG. 13 generally includes a one piece outer shell or support 136 and an inner mold shell 137 which are attached together to define a fluid passage 138 therebetween. The inner shell 137 has a surface 139 which defines an outer surface of a cavity 140 in which the parison 130 is injection molded. A core member 142 is positioned such that an outer core shell 143 extends into the inner mold shell 137 for defining an interior surface of the mold cavity 140. A central member 144 extends into the core shell 143 to provide rigidity to the core shell 143 and, also, to define with the core shell 143 passages 145 through which a heat transfer fluid is circulated. The heat transfer fluid flows from a central inlet passage 146 through the passages 145 to an outlet passage 147 for removing heat from the interior of the injection molded parison 130. The passages 145 and the wall thickness of the outer core shell 143 are shown as being substantially uniform for uniform heat transfer from the molded parison 130. The core member 142 also includes a carrier 148 in which the core shell 143 and the central member 144 are telescopically mounted. A tubular sleeve 149 is positioned between the carrier 148 and the core shell 143. The sleeve 149 is mounted such that a lower sleeve edge 150 forms a portion of a rim 151 on the parison 130. When the sleeve 149 is lifted axially within the carrier 148, a low pressure gas inlet 152 is connected to the interface between the parison 130 and the core shell 143, as will be discussed in greater detail below.

The parison 130 is injection molded by forcing softened thermoplastic material through an orifice 153 in a gate 154. The thermoplastic material flowing through the orifice 153 flows upwardly through the cavity 140. As the material flows through the orifice 153 upwardly into the cavity 140, the walls of the cavity 140 adjacent the orifice 153 which are first contacted by the thermoplastic material will be subjected to considerably more heat than the walls of the cavity 140 adjacent the parison rim 151. It is desirable to remove more heat from the parison 130 in the region adjacent the gate 153 than in the region adjacent the rim 151 since the material which finally reaches the rim 151 will have been cooled as it was forced through the cavity 140. In accordance with the present invention, the rate at which heat is removed from the thermoplastic material forming the parison 130 is controlled by varying the wall thickness of the inner shell 137 and also by varying the cross sectional area of the fluid passage 138. A lower region 155 of the inner mold shell 137 adjacent the orifice 153 has a predetermined thin wall thickness to facilitate a rapid heat transfer from the adjacent portions of the preform 140. The wall thickness, and consequently the length of the conductive heat transfer path, progressively increases from the lower region 155 to an upper region 156 of the inner mold shell 137 which has a predetermined thickness greater than that of the lower region 155 in order to progressively decrease the cooling rate for the parison 130 as the thermoplastic material moves progressively towards the parison rim 151.

In addition to varying the length of the heat transfer path between various regions of the parison 130 and the heat transfer fluid circulated through the passage 138, the flow velocity and turbulence of the fluid circulated through the passage 138 is also modified to affect the heat transfer rate. A suitable temperature controlled heat transfer fluid is supplied through an inlet 157 connected to the passage 138 adjacent the injection gate 154. The fluid flows upwardly through the passage 138 to an outlet 158 which is located at adjacent the parison rim 151. By circulating the fluid in this direction, the coolest fluid which flows through the inlet 157 initially contacts the hottest areas of the mold. The passage 138 has a region 159 adjacent the inlet 157 which is of a predetermined small cross sectional area and increases in cross sectional area to an upper region 160 adjacent the outlet 158. As the heat transfer fluid flows upwardly through the passage 138 from the inlet 157 to the outlet 158, the flow velocity decreases and turbulence increases to decrease the rate at which heat is removed from the inner mold shell 137. As a consequence of varying the wall thickness of the inner mold shell 137 and of simultaneously varying the cross sectional area of the heat transfer fluid passage 138, the parison 130 will have a more uniform temperature than would otherwise occur when the parison 130 is transferred into the temperature conditioning mold 132.

After the parison 130 is injection molded and subjected to an initial stage of thermal conditioning, it is transferred along with the core member 142 into the thermal conditioning mold 132 which brings the temperature of the parison 130 to equilibrium. The thermal conditioning mold 132 generally consists of a support or outer mold shell 164 and an inner mold shell 165 which are mounted together to define a heat transfer fluid passage 166. Heat transfer fluid flows from an inlet 167 through the passage 166 to an outlet 168 to cool the inner mold shell 165. The cross sectional area of the passage 166 is non-varying so that the flow velocity of the heat transfer fluid is constant throughout the passage 166 for removing heat uniformly from the inner mold shell 165, At the same time, the inner mold shell 165 has uniform wall thicknesses so that heat is uniformly removed from the exterior surface of the preform 130. Heat transfer fluid also is circulated from the inlet 146 through the core passages 145 to the outlet 147 for uniformly removing heat from the interior surface of the preform 130. When the preform 130 is removed from a cavity 169 within the conditioning mold 132, it has a substantially uniform temperature throughout. Since temperature variations within the preform 130 were considerably reduced in the injection mold 131 through the provision of zone controlled cooling in accordance with the present invention, the soaking time required for holding the perform 130 within the conditioning mold 132 is reduced.

From the conditioning mold 132, the thermally conditioned preform 130 and the core member 142 are transferred to the final blow mold 134, as shown in FIG. 15. The final blow mold 134 is in the form of a split mold including two mold halves 170 and 171 which, when positioned together, define a cavity 172 having the shape of the exterior surface of the finished blown bottle 135. After the thermally conditioned preform 130 is positioned within the cavity 172, the tubular sleeve 149 is raised to expose the low pressure gas inlet 152. Gas then flows through the inlet to the interface between the preform 130 and the outer core shell 143 to expand or balloon the preform 130 into the shape 133. The preform 130 is ballooned into the shape 133 to permit stretching the shape 133 towards a cavity bottom 173 without dragging the thermoplastic material along the surfaces of the outer core shell 143.

After the preform is puffed into the shape 133, the sleeve 149 is returned to its lowered position wherein the low pressure gas inlet 152 is blocked. The outer core shell 143 of the core member 142 is then advanced telescopically through the sleeve 149 to stretch the shape 133 into an extended shape represented by the dashed line 174 in FIG. 16. As the outer core shell 143 is moved downwardly through the sleeve 149, a groove 175 in the outer core shell 143 moves to a position wherein a high pressure gas inlet 176 is connected by the groove 175 to the inside of the stretched or extended preform 174. High pressure gas then flows through the inlet 176 and the groove 175 to inflate the thermoplastic material into contact with the walls of the cavity 172, thereby forming the shape of the finished bottle 135. Through the stretching and blowing operations, the walls of the finished bottle 135 are biaxially oriented to greatly increase the strength of the bottle 135. After the thermoplastic material is expanded into the shape of the bottle 135, the bottle 135 is quickly set through contact with the cool blow mold 134. The mole halves 170 and 171 are then separated and the finished bottle 135 is ejected from the core member 142.

Figure 19:
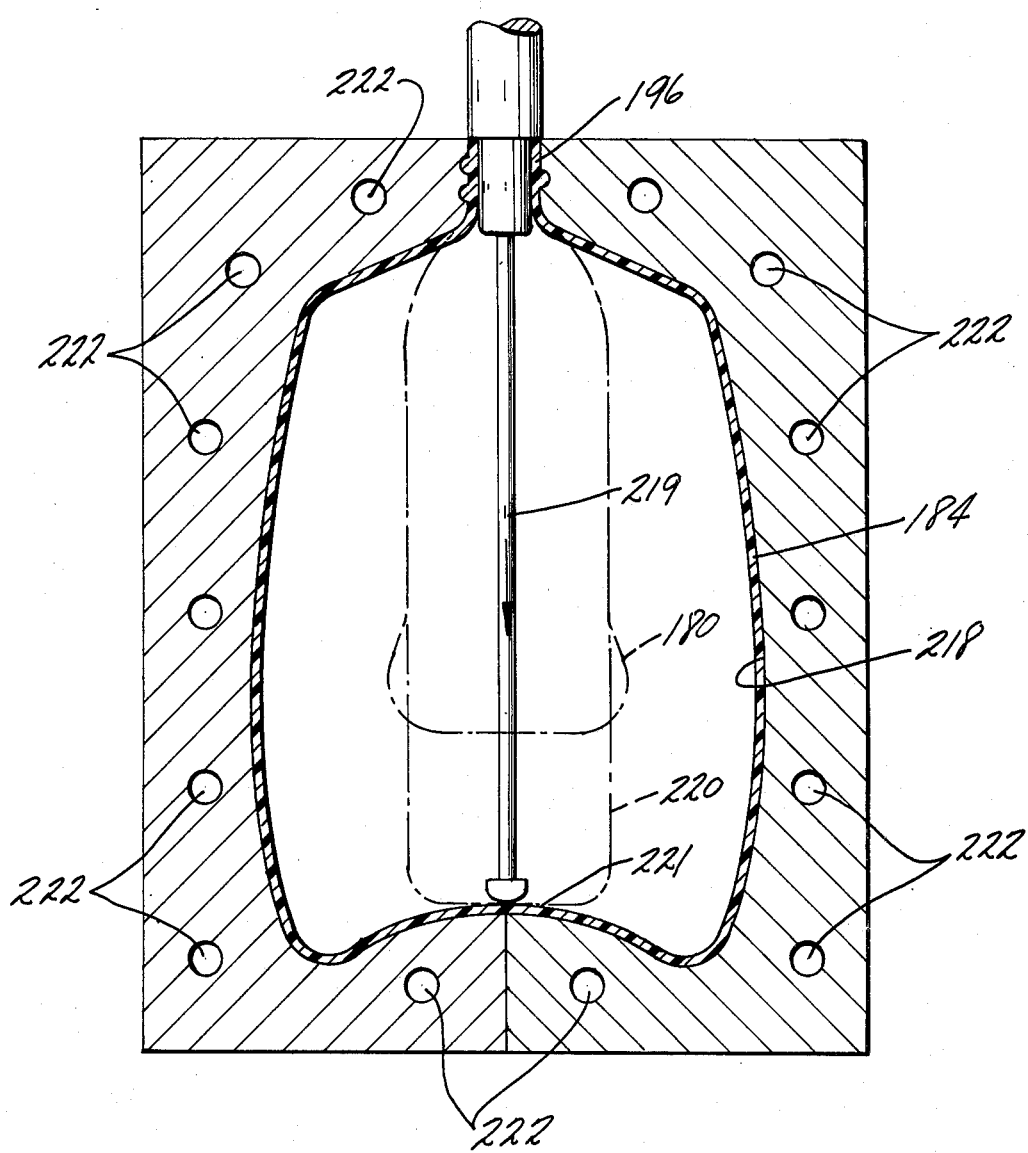
FIG. 19 is a vertical cross sectional view showing the thermally conditioned parison from FIG. 18 blow molded into a biaxially oriented hollow finished article.

FIGS. 17-19 show application of the present invention to a process for manufacturing a hollow article such as a bottle from an extruded parison which is thermally conditioned and then stretched and blown into a biaxially oriented hollow article. FIG. 17 shows the step of blowing and zone cooling a preform 180 in a mold 181. The preform 180 is further blown and soaked for thermal conditioning in a mold 182. The thermally conditioned preform is then transferred to a final blow mold 183, as shown in FIG. 19, where it is stretched and blown into a finished article 184.

As shown in FIG. 17, the mold 181 includes two mold halves 185 and 186. The mold half 185 includes an outer shell or support 187 and an inner shell 188 with a fluid passage 189 extending therebetween. Similarly, the mold half 186 includes an outer shell 190 and an inner shell 191 with a fluid passage 192 extending therebetween. The inner shells 188 and 191 define a cavity 193 in which the preform 180 is molded from an extruded tubular parison (not shown). A pin 194 on a blow head 195 is inserted into the upper end of the preform 180 for injecting blow air to inflate the parison and also for molding a neck 196 on the preform 180. A controlled temperature heat transfer fluid is supplied from a suitable source through a fluid inlet 197 to the passage 189 in the mold half 185 adjacent the neck 196 and is removed from the passage 189 from an outlet 198 at the lower end of the passage 189. Similarly, fluid is supplied through an inlet 199 connected to the passage 192 is the mold half 186 adjacent the neck 196 and flows downwardly through the passage 192 to an outlet 200 adjacent the bottom of the passage 192. The pin 194 tends to hold heat within the bottle neck 196 and the immediately adjacent regions which in turn tends to affect the uniformness at which the preform 180 is stretched during the final stretch and blow operation. Therefore, zone controlled cooling is provided for removing a greater amount of heat from the ncek 196 than from the remainder of the preform 180. A mass 201 of a suitable metal is added to the interior of the outer mold shell 187 to constrict the passage 189 in the region of the bottle neck 196 and a similar mass 202 is added to the interior of the outer mold shell 190 to constrict the passage 192 in the region of the neck 196. The constrictions cause an increase in the flow velocity of the heat transfer fluid in the region of the bottle neck 196 and also causes the flow to be laminar in this region. This in turn increases the rate at which heat is transferred from the bottle neck 196 to the heat transfer fluid. The remainder of the passages 189 and 192 are of a larger, uniform cross sectional area to permit a slower and more tubulent fluid flow for a lower heat transfer rate.

After the preform is blown and initially thermal conditioned within the mold 181 and a tail 203 is removed, it is transferred to a cavity 205 in the mold 182, as shown in FIG. 18. The cavity 205 is slightly larger than the cavity 193 to facilitate insertion of the preform 180. The preform 180 is then expanded further by injecting air through the pin 194 in the blow head 195 until the preform 180 contacts the walls of the cavity 205. The mold 182 includes two mold halves 206 and 207 which are separable to permit insertion and removal of the preform 130 in the cavity 205. The mold half 206 includes an outer shell 208 and an inner shell 209 which are mounted together to define a fluid passage 210 and the mold half 207 includes an outer shell 211 and an inner shell 212 wich are mounted together to define a fluid passage 213. A temperature controlled heat transfer fluid is circulated from an inlet 214 through the passage 210 to an outlet 215 and from an inlet 216 through the passage 213 to an outlet 217. The passages 210 and 213 and the wall thickness of the inner mold shells 209 and 212 are uniform to provide uniform cooling for the preform 180. The preform 180 is allowed to soak in the cavity 205 until it reaches equilibrium.

After the preform 180 is thermally conditioned within the mold 182, it is transferred to a cavity 218 in the final blow mold 183, as shown in FIG. 19. A plunger 219 is then extended through the neck 196 of the preform 180 to stretch the preform 180 into an elongated shape 220 which extends substantially to a bottom 221 of the cavity 218. Air is then injected through the bottle neck 196 to expand the elongated or stretched shape 220 into the shape of the finished bottle 184. As the thermoplastic material is expanded into contact with the walls of the cavity 218, the material is cooled and set through conventional cooling techniques, as by circulating a heat transfer fluid through passages 222 in the blow mold 183. The mold 183 is then opened to eject the finished bottle 184, or other hollow article manufactured by the above described method.

In the above described and illustrated embodiments of the invention, the thermal history of zones or portions of the preforms which were to be stretched the greatest were controlled to achieve a slightly higher temperature than the remainder of the preform. However, in certain situations a greater heat transfer rate may be required for these zones rather than a lower heat transfer rate. For example, the extrusion of a tubular parison is sometimes programmed to increase the wall thickness in areas of the parison which are stretched the greatest during formation of a finished hollow article. This provides additional material in these zones so that the walls of the finished article will be more uniform. However, considerably more heat is present in these zones of the parison due to the increased material mass. If these zones are cooled at the same heat transfer rate as the remainder of the parison, they will have a higher temperature than the remainder of the parison when it is removed from a preform mold. The higher temperature can cause these zones to expand more rapidly than the remainder of the preformed parison, and even to rupture, during the final blow molding step. Through the use of the present invention, an increased heat transfer rate can be provided for zones of the preform having the greatest mass or wall thickness to achieve a desired thermal history for the preform.

It should also be noted that, through radiation losses, the lower end of an extruded parison will be cooler than the upper end. This temperature variation is detrimental in achieving either a uniform wall thickness in a hollow article blow molded from the parison or a desired degree of biaxial orientation in the finished article. The significance of minor temperature variations will be appreciated after considering that, in certain materials, a temperature variation of only 5° F. may result in a variation of 50% or more in the wall thickness of the blow molded article. For a biaxially orientated article, the orientation temperature range is as small as 1° F. for some materials and up to 20° F. or more for other materials. In view of these critical temperatures, the mold and method of the present invention are useful for compensating for temperature variations along the length of an extruded parison to increase the uniformity and quality of the finished article.

From the above description, it will be appreciated that the present invention is adaptable to various methods for blow molding hollow articles from a thermoplastic material in which it is desirable or necessary to provide a zone controlled thermal history for a preform or a parison prior to expanding into a finished article. The method is equally applicable to processes which use free extruded parisons and to processes which use injection molded parisons for forming hollow articles. The method for providing zone controlled cooling is particularly useful for manufacturing blow molded articles from a thermoplastic material such that the articles have biaxially oriented walls. However, the method is also useful for controlling the thermal history in a parison to permit blow molding the parison into a hollow article having a uniform wall thickness, even though the article is not biaxially oriented. The zone controlled thermal conditioning for the parison may be implemented either by varying the length of a heat transfer path between the parison and a heat transfer fluid or by varying the flow velocity and turbulence of the fluid, or by a combination thereof. The length of the heat transfer path is changed by adding or removing material to the mold walls and/or by using materials of different thermal conductivities in the mold walls. Furthermore, zone controlled thermal conditioning according to the present invention may be applied to either the exterior surface, the interior surface or both surfaces of the parison. Various changes and modifications may be made in the above described method and mold for thermal conditioning a parison without departing from the spirit and scope of the following claims.

What I claim is:

1. In a process for manufacturing a hollow article from a thermoplastic material capable of biaxial orientation in which a parison formed from such material is blown, while at a temperature within the orientation temperature range of said material, in a final blow mold into the shape of the article and wherein predetermined portions of the parison are stretched more than other portions of the parison during blow molding, the improvement comprising the step of thermal conditioning the parison, which is initially at a higher temperature than said orientation temperature range desired in said final blow mold, in a shell mold having an inner shell which receives the parison in a first cavity and an outer shell, wherein a second cavity is the space defined by the walls of said inner and outer shells, said inner shell being so constructed such that, when a heat transfer fluid is circulated throughout said second cavity to cool the parison, the predetermined portions of the parison are differentially cooled at a slower rate than the other portions of the parison, and transferring the parison from said shell mold to said final blow mold when the other portions of the parison have reached a predetermined temperature of about the orientation temperature for the material and the predetermined portions are at a somewhat higher temperature than the outer portions, said differential cooling in said shell mold being achieved by transferring heat faster to said parison through portions of the walls of said inner shell adjacent said other portions than through portions of the walls of said inner shell adjacent said predetermined portions.

2. In a process for thermal conditioning a hot thermoplastic material parison prior to manufacturing a hollow article by blow molding said parison and during said blow molding effecting biaxial orientation by blow molding said parison at a temperature within the orientation temperature range of said material, wherein the shape of the final blow mold is such that predetermined portions of the parison are stretched more than other portions of the parison during such blow molding, and wherein such predetermined portions are cooled to a higher temperature than the other portions of the parison, the improvement comprising effecting the cooling by placing the parison in a shell mold having an outer shell and an inner shell which receives the parison and is in contact with the parison, said inner shell and said outer shell defining a cavity therebetween, the portions of the walls of said inner shell adjacent said predetermined portions being thicker so as to transfer heat by conduction more slowly to said parison than the other portions of the walls of the inner shell for an equal driving force, and flowing heat transfer fluid through said single cavity to cool the parison and thus transferring heat more slowly through said portions of the walls of said inner shell adjacent said predetermined parison portions than through the walls of the inner shell adjacent said other parison portions, and continuing said cooling until said other portions of the parison have reached a predetermined desired temperature of about the orientation temperature range of said thermoplastic.

* * * * *

UNITED STATES PATENT OFFICE
CERTIFICATE OF CORRECTION

PATENT NO. : 4,206,171

DATED : June 3, 1980

INVENTOR(S) : Albert R. Uhlig

It is certified that error appears in the above-identified patent and that said Letters Patent are hereby corrected as shown below:

Col. 2, line 56, "in" should be ---is---.

Col. 14, line 28, "130" should be ---180---.

Col. 16, Claim 1, line 28, "outer" should be ---other---.

Signed and Sealed this

Seventeenth Day of November 1981

[SEAL]

Attest:

GERALD J. MOSSINGHOFF

Attesting Officer

Commissioner of Patents and Trademarks